US012786851B2

(12) United States Patent
Yang

(10) Patent No.: US 12,786,851 B2
(45) Date of Patent: Nov. 3, 2026

(54) AUXILIARY INFORMATION SENDING METHOD AND DEVICE, AUXILIARY INFORMATION RECEIVING METHOD AND DEVICE, COMMUNICATION APPARATUS AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 288 days.

(21) Appl. No.: 18/701,656

(22) PCT Filed: Oct. 22, 2021

(86) PCT No.: PCT/CN2021/125853
§ 371 (c)(1),
(2) Date: Apr. 16, 2024

(87) PCT Pub. No.: WO2023/065340
PCT Pub. Date: Apr. 27, 2023

(65) Prior Publication Data
US 2025/0247770 A1 Jul. 31, 2025

(51) Int. Cl.
*H04W 48/08* (2009.01)

(52) U.S. Cl.
CPC .................................. *H04W 48/08* (2013.01)

(58) Field of Classification Search
CPC ..... H04W 48/08; H04W 48/10; H04W 48/12; H04W 48/14; H04W 40/02; H04W 40/22; H04W 24/02; H04W 88/04; H04W 92/18; H04W 4/70
See application file for complete search history.

(56) References Cited

U.S. PATENT DOCUMENTS

2021/0120476 A1 4/2021 Lee et al.
2022/0191971 A1* 6/2022 Xu ...................... H04W 68/005
2023/0308991 A1* 9/2023 Zhang ................... H04W 48/14
2024/0008058 A1* 1/2024 Chang ................... H04W 48/14

FOREIGN PATENT DOCUMENTS

CN 105228218 A 1/2016
JP 2021503737 A 2/2021
JP 2021516508 A 7/2021
WO 2021136377 A1 7/2021
(Continued)

OTHER PUBLICATIONS

"Consideration on the control plane procedure of SL relay", ZTE, Sanechips, 3GPP TSG-RAN WG2 Meeting #114 electronic, R2-2104978, Online, May 19-27, 2021, 14 pages.
(Continued)

*Primary Examiner* — Farid Seyedvosoghi
(74) *Attorney, Agent, or Firm* — Finnegan, Henderson, Farabow, Garrett & Dunner, L.L.P.

(57) ABSTRACT

An auxiliary information sending method is applicable to first user equipment (UE), and includes: sending first auxiliary information to second user equipment (UE), wherein the first auxiliary information indicates to the second UE first system information required by the first UE.

19 Claims, 5 Drawing Sheets

(56) References Cited

FOREIGN PATENT DOCUMENTS

WO 2022033531 A1 2/2022

OTHER PUBLICATIONS

Notice of Reasons for Refusal issued by the Japanese Patent Office on Jul. 1, 2025, in corresponding Application No. JP 2024-523531, 12 pages.
International Search Report and Written Opinion of International Application No. PCT/CN2021/125853, dated Jul. 19, 2022, 14 pages.
"On-demand SI Delivery for Remote UE", Catt, 3GPP TSG-RAN WG2 Meeting #112-e, R2-2008922, Electronic, Nov. 2-13, 2020, 4 pages.
Extended European Search Report Issued in Application No. 21961083.9 dated Nov. 25, 2024, 10 pages.
Notice of Reasons for Refusal issued by the Japanese Patent Office on Mar. 11, 2025, in corresponding Application No. JP 2024-523531, 8 pages.

* cited by examiner

AUXILIARY INFORMATION SENDING METHOD AND DEVICE, AUXILIARY INFORMATION RECEIVING METHOD AND DEVICE, COMMUNICATION APPARATUS AND STORAGE MEDIUM

CROSS-REFERENCE TO RELATED APPLICATION

This application is a U.S. national stage application of International Application No. PCT/CN2021/125853, filed on Oct. 22, 2021, the entire content of which is incorporated herein by reference.

FIELD

The present disclosure relates to the technical field of communication, and more particularly, to an auxiliary information sending method, an auxiliary information receiving method, an auxiliary information sending device, an auxiliary information receiving device, a communication apparatus and a computer-readable storage medium.

BACKGROUND

In order to support direct communication between terminals, a sidelink communication method has been introduced, which allows for the direct communication between terminals based on sidelink.

Based on communication between terminals, terminal A may not directly establish a communication connection with a base station, but instead establish a sidelink with terminal B, and realize communication with the base station through a relay of terminal B. When terminal A and terminal B are used as user equipment (UE), terminal A may be called remote UE, and terminal B may be called relay UE.

When the remote UE needs to obtain required system information, a system information request is sent to the relay UE, and the relay UE obtains system information of interest to the remote UE and sends the system information to the remote UE.

SUMMARY

According to a first aspect of embodiments of the present disclosure, there is provided an auxiliary information sending method, applicable to first user equipment (UE). The auxiliary information sending method includes: sending first auxiliary information to second user equipment (UE), in which the first auxiliary information indicates to the second UE first system information required by the first UE.

According to a second aspect of embodiments of the present disclosure, there is provided an auxiliary information receiving method, applicable to second UE. The auxiliary information receiving method includes: receiving first auxiliary information sent by first UE; and determining first system information required by the first UE according to the first auxiliary information.

According to a third aspect of embodiments of the present disclosure, there is provided an auxiliary information receiving method, applicable to a network-side apparatus. The auxiliary information receiving method includes: receiving second auxiliary information sent by second UE; and determining first system information required by first UE according to the second auxiliary information.

BRIEF DESCRIPTION OF DRAWINGS

The accompanying drawings of the present disclosure will be briefly introduced below. The drawings in the following description merely represent some examples of embodiments of the present disclosure.

DETAILED DESCRIPTION

Technical solutions in the embodiments of the present disclosure will be clearly and completely described with reference to the drawings. The described embodiments are only part of rather than all of embodiments of the present disclosure. Based on the embodiments in the present disclosure, all other embodiments obtained without creative effort by those skilled in the art belong to the protection scope of the present disclosure.

Terms used in the embodiments of the present disclosure are only for the purpose of describing specific embodiments, and are not intended to limit embodiments of the present disclosure. The singular forms “a/an” and “the” used in embodiments of the present disclosure and the appended claims are also intended to include plural forms, unless clearly indicated otherwise. It should also be understood that the term “and/or” as used herein refers to and includes any or all possible combinations of one or more associated listed items.

It should be understood that although terms, such as “first,” “second,” and “third,” may be used to describe various information in the embodiments of the present disclosure, these information should not be limited to these terms. These terms are only used to distinguish information of the same type from each other. For example, without departing from the scope of embodiments of the present disclosure, first system information may also be called second system information, and similarly, the second system information may also be called the first system information. Depending on the context, the term “if” may be construed to mean “when” or “upon” or “in response to determining”.

For the sake of conciseness and ease of understanding, terms used to represent size relationships include “greater than,” “less than,” “higher than” or “lower than”. However, it can be understood by those skilled in the art that the term “greater than” also covers the meaning of “greater than or equal to”; the term “less than” also covers the meaning of “less than or equal to”; the term “higher than” covers the meaning of “higher than or equal to”; and the term “lower than” also covers the meaning of “lower than or equal to”.

Based on communication between terminals, remote user equipment (UE) may not directly establish a communication connection with a base station, but instead establish a sidelink with relay UE, and realize communication with the base station through a relay of the relay UE. However, when the system information required by the remote UE is updated on a network side, the remote UE does not know that the system information has been updated on the network side, so the remote UE will not send any system information request to the relay UE. As a result, the relay UE cannot send the updated system information required by the remote UE to the remote UE in time, even if the relay UE obtains the updated system information on the network side.

Figure 1:
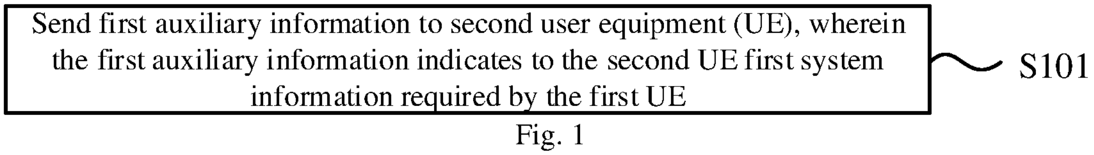
FIG. 1 is a schematic flow chart of an auxiliary information sending method according to an embodiment of the present disclosure.

FIG. 1 is a schematic flow chart of an auxiliary information sending method according to an embodiment of the present disclosure. The auxiliary information sending method in this embodiment is applicable to first UE (User Equipment), and the first UE can communicate with second UE, for example through a sidelink. An interface between the first UE and the second UE is a PC-5 interface. The first UE and the second UE include but are not limited to mobile phones, tablet computers, wearable devices, sensors, IoT (Internet of Things) devices and other communication apparatuses.

In an embodiment, when executing the steps in the auxiliary information sending method, the first UE can be in a connected state or a disconnected state (such as an idle state and an inactive state), which can be set as required.

In some embodiments of the present disclosure, the first UE may be used as remote UE, and the second UE may be used as relay UE. That is, there may be a communication connection between the second UE and a base station, and there is no communication connection between the first UE and the base station.

It should be noted that the above description does not mean that the first UE is always in the disconnected state and the second UE is always in the connected state. For example, in an embodiment shown in FIG. 1, the first UE can communicate with the second UE when the first UE is in the connected state or when the first UE is in the disconnected state. Instead, embodiments of the present disclosure will be exemplified mainly in the case that the first UE acts as the remote UE and the second UE acts as the relay UE.

In an embodiment, the base station includes but is not limited to, a 4G base station, a 5G base station, a 6G base station and a base station in other communication systems.

As shown in FIG. 1, the auxiliary information sending method includes: step S101, sending first auxiliary information to the second UE, in which the first auxiliary information indicates to the second UE first system information required by the first UE.

In an embodiment, the first UE may determine the system information (SI) needed by itself, which may include a master information block (MIB) or a system information block (SIB), such as SIB1 or other SIBs.

The system information required by the first UE can be the system information that the first UE needs to use at present (also called the required SI) or the system information that the first UE predicts will be used.

Further, the first UE can send the first auxiliary information to the second UE, and the first system information required by the first UE is indicated to the second UE through the first auxiliary information.

In an embodiment, the first auxiliary information includes an interest identifier corresponding to the first system information. For example, the required system information can be indicated by an interest identifier, which can be, for example, an SIB identifier, a system information identifier, or other identifiers corresponding to the system information. The first auxiliary information can carry the interest identifier corresponding to the first system information, and the interest identifier and the system information can have a one-to-one relationship, that is, one interest identifier bit corresponding to one type of system information, or have a one-to-many relationship, that is, one interest identifier bit corresponding to many types of system information.

The second UE and the first UE can store the association relationship between the interest identifier and the system information. After receiving the first auxiliary information, the second UE can determine the corresponding system information in the association relationship according to the interest identifier as the first system information required by the first UE, and record and store the type of the first system information required by the first UE. Further, when determining that the first system information is updated, the second UE can acquire the updated first system information and send the updated first system information to the first UE. As a result, even if the first UE does not know that the base station has updated the first system information, the first UE can acquire the updated first system information in time from the second UE.

According to the embodiment of the present disclosure, the first UE can instruct the second UE through the first auxiliary information, so that the second UE can know the system information required by the first UE, and hence the second UE can send the updated first system information to the first UE in time when subsequently determining that the first system information is updated. As a result, the first UE can obtain the updated first system information in time from the second UE even if the first UE does not know that the base station has updated the first system information.

It should be noted that when the second UE serving as relay UE communicates with the first UE serving as remote UE through sidelink, the communication modes include at least one of unicast, multicast and broadcast.

For example, the second UE can send the updated first system information to the first UE by unicast, and broadcast the SIB1 received from the base station by broadcast, so that the first UE can determine whether the first system information currently stored by the first UE is the latest according to the SIB1 broadcast by the second UE. If not, it can send a system information request to the second UE to request the second UE to send the latest first system information to the first UE.

Although this method can also enable the first UE to obtain the latest first system information from the second UE, in this process, the first UE needs to determine whether the first system information needs to be updated according to the SIB1 broadcast by the second UE, and then send a system information request to the second UE when the first system information needs to be updated. However, based on the embodiment shown in FIG. 1, the latest first system information can be obtained from the second UE before the first UE executes these steps, thus ensuring that the latest first system information can be obtained as soon as possible.

Figure 2:
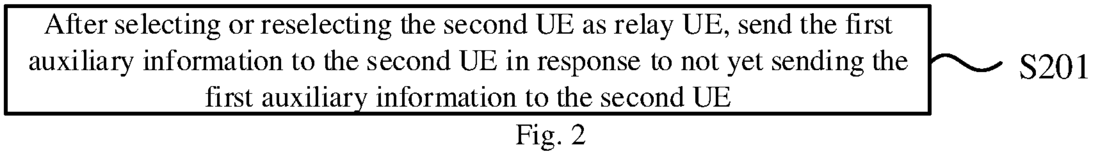
FIG. 2 is a schematic flow chart of another auxiliary information sending method according to an embodiment of the present disclosure.

FIG. 2 is a schematic flow chart of another auxiliary information sending method according to an embodiment of the present disclosure. As shown in FIG. 2, sending the first auxiliary information to the second UE includes: step S201, after selecting or reselecting the second UE as relay UE, sending the first auxiliary information to the second UE in response to not yet sending the first auxiliary information to the second UE.

In an embodiment, after the first UE sends the first auxiliary information to any UE, the identifier of the UE can be recorded, and then whether the first auxiliary information has been sent to the second UE can be determined according to the recorded identifier after the second UE is selected or re-selected. If the first auxiliary information has not been sent to the second UE, the first auxiliary information will be sent to the second UE, and if the first auxiliary information has been sent to the second UE, it is unnecessary to send the first auxiliary information to the second UE, which, accordingly, is beneficial to avoid the waste of communication resources.

Figure 3:
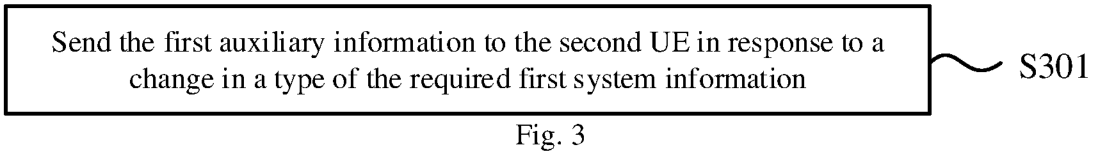
FIG. 3 is a schematic flow chart of yet another auxiliary information sending method according to an embodiment of the present disclosure.

FIG. 3 is a schematic flow chart of yet another auxiliary information sending method according to an embodiment of the present disclosure. As shown in FIG. 3, sending the first auxiliary information to the second UE includes: step S301, sending the first auxiliary information to the second UE in response to a change in a type of the required first system information.

In an embodiment, the type of the first system information required by the first UE can be changed as needed. For example, if the type of the first system information is SIB2 and then is changed to SIB3 as needed, the type of the first system information is changed. In this case, the first auxiliary information can be sent to the second UE, and the second UE can determine the type of the changed first system information required by the first UE according to the first auxiliary information, for example, the type can be determined as SIB3, and then when the SIB3 is updated, the updated SIB3 can be acquired and sent to the first UE.

In an embodiment, the first auxiliary information carries a request identifier, configured to instruct the second UE to send a latest version of system information corresponding to the request identifier to the first UE.

The first UE can also determine the system information that needs to be acquired at present. For example, the first UE can determine that the versions of some currently stored system information are not latest according to the SIB1 broadcast by the second UE, then that these versions are not the latest system information can be used as the system information that needs to be acquired, and then a request identifier can be added to the first auxiliary information and sent to the second UE.

The system information requested by the first UE can be indicated by the request identifier, and the first auxiliary information can carry the request identifier, and the request identifier and the system information can have a one-to-one relationship, that is, one request identifier bit corresponds to one type of system information, or the request identifier and the system information can have a one-to-many relationship, that is, one request identifier bit corresponds to many types of system information.

The second UE can send the latest version of system information corresponding to the request identifier to the first UE. For example, the second UE currently stores the latest version of system information corresponding to the request identifier, so it can directly send the stored latest version of system information corresponding to the request identifier to the first UE. For example, the second UE does not currently store the latest version of system information corresponding to the request identifier, so it can obtain the latest version of system information corresponding to the request identifier from the base station and send it to the first UE, and then send the obtained system information to the first UE.

Figure 4:
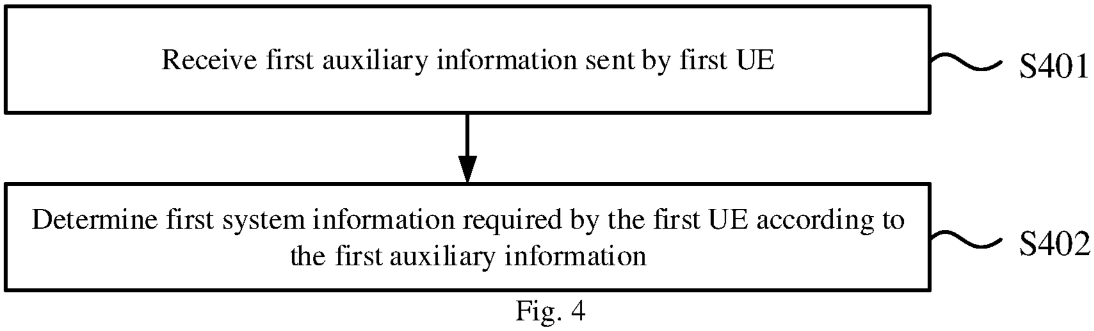
FIG. 4 is a schematic flow chart of an auxiliary information receiving method according to an embodiment of the present disclosure.

FIG. 4 is a schematic flow chart of an auxiliary information receiving method according to an embodiment of the present disclosure. The auxiliary information receiving method shown in this embodiment is applicable to second UE, and the second UE can communicate with first UE, for example, through a sidelink. An interface between the first UE and the second UE is a PC-5 interface. The first UE and the second UE include but are not limited to mobile phones, tablet computers, wearable devices, sensors, IoT (Internet of Things) devices and other communication apparatuses.

In an embodiment, when the first UE communicates with the second UE, the first UE can be in a connected state or a disconnected state (such as an idle state and an inactive state), which can be set as required.

In some embodiments of the present disclosure, the first UE may be used as remote UE, and the second UE may be used as relay UE. That is, there may be a communication connection between the second UE and a base station, and there is no communication connection between the first UE and the base station.

It should be noted that the above description does not mean that the first UE is always in the disconnected state and the second UE is always in the connected state. For example, in an embodiment shown in FIG. 4, the first UE can communicate with the second UE when the first UE is in the connected state or when the first UE is in the disconnected state. Instead, embodiments of the present disclosure will be exemplified mainly in the case that the first UE acts as the remote UE and the second UE acts as the relay UE.

In an embodiment, the base station includes but is not limited to, a 4G base station, a 5G base station, a 6G base station and a base station in other communication systems.

As shown in FIG. 4, the auxiliary information sending method includes: step S401, receiving first auxiliary information sent by first UE; and step S402, determining first system information required by the first UE according to the first auxiliary information.

In an embodiment, the first UE may determine the system information SI needed by itself, and the system information may include a main system information block (MIB) or a system information block (SIB), such as SIB1 or other SIBs.

The system information required by the first UE can be the system information that the first UE needs to use at present (also called the required SI) or the system information that the first UE predicts will be used.

Further, the first UE can send the first auxiliary information to the second UE and indicate the first system information required by the first UE to the second UE through the first auxiliary information.

In an embodiment, the first auxiliary information includes an interest identifier corresponding to the first system information. For example, the required system information can be indicated by the interest identifier, and the first auxiliary information can carry the interest identifier corresponding to the first system information. The interest identifier and the system information can have a one-to-one relationship, that is, one interest identifier bit corresponds to one type of system information, or the interest identifier and the system information can have a one-to-many relationship, that is, one interest identifier bit corresponds to many types of system information.

The second UE and the first UE can store the association relationship between the interest identifier and the system information. After receiving the first auxiliary information, the second UE can determine the corresponding system information in the association relationship according to the interest identifier as the first system information required by the first UE, and record and store the type of the first system information required by the first UE. Further, when determining that the first system information is updated, the second UE can acquire the updated first system information and send the updated first system information to the first UE. As a result, even if the first UE does not know that the base station has updated the first system information, the first UE can acquire the updated first system information in time from the second UE.

According to the embodiment of the present disclosure, the first UE can instruct the second UE through the first auxiliary information, so that the second UE can know the system information required by the first UE, and hence the second UE can send the updated first system information to the first UE in time when subsequently determining that the first system information is updated. As a result, the first UE can obtain the updated first system information in time from the second UE even if the first UE does not know that the base station has updated the first system information.

It should be noted that when the second UE acting as relay UE communicates with the first UE acting as remote UE through sidelink, the communication modes include at least one of unicast, multicast and broadcast.

For example, the second UE can send the updated first system information to the first UE by unicast, and broadcast the SIB1 received from the base station by broadcast, so that the first UE can determine whether the first system information currently stored by itself is latest according to the SIB1 broadcast by the second UE. If the first system information currently stored is not the latest, the first UE can send a system information request to the second UE to request the second UE to send the latest first system information to the first UE.

Although this method can also enable the first UE to obtain the latest first system information from the second UE, in this process, the first UE needs to determine whether the first system information needs to be updated according to the SIB1 broadcast by the second UE, and then send a system information request to the second UE when the first system information needs to be updated. However, based on the embodiment shown in FIG. 1, the latest first system information can be obtained from the second UE before the first UE executes these steps, thus ensuring that the latest first system information can be obtained as soon as possible.

Figure 5:
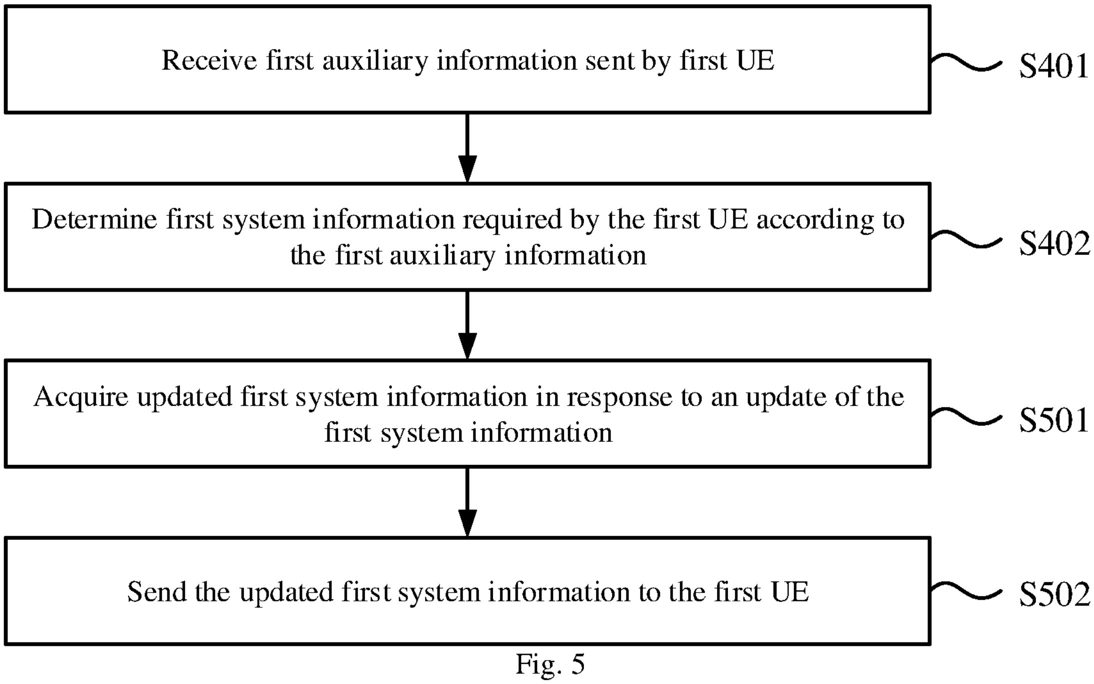
FIG. 5 is a schematic flow chart of another auxiliary information receiving method according to an embodiment of the present disclosure.

FIG. 5 is a schematic flow chart of another auxiliary information receiving method according to an embodiment of the present disclosure. As shown in FIG. 5, the auxiliary information receiving method further includes: step S501, acquiring updated first system information in response to an update of the first system information; and step S502, sending the updated first system information to the first UE.

In an embodiment, by receiving the SIB1 broadcast by the base station, the second UE can determine whether the first system information is updated according to the version number relevant with the first system information in the SIB1. For example, the second UE can store the first system information and the corresponding version number, after receiving the SIB1 broadcast by the base station, the second UE can determine whether the version number corresponding to the first system information carried in SIB1 is the same as the stored version number, if so, it is determined that the first system information has not been updated; if not, it is determined that the first system information has been updated.

Further, in the case that it is determined that the first system information is updated, the updated first system information broadcast by the base station can be received according to the configuration of the first system information in SIB1, or in the case that the base station does not broadcast the first system information, a request is sent to the base station to request the base station to broadcast the updated first system information, thereby receiving the updated first system information. Further, the obtained updated first system information can be sent to the first UE.

Figure 6:
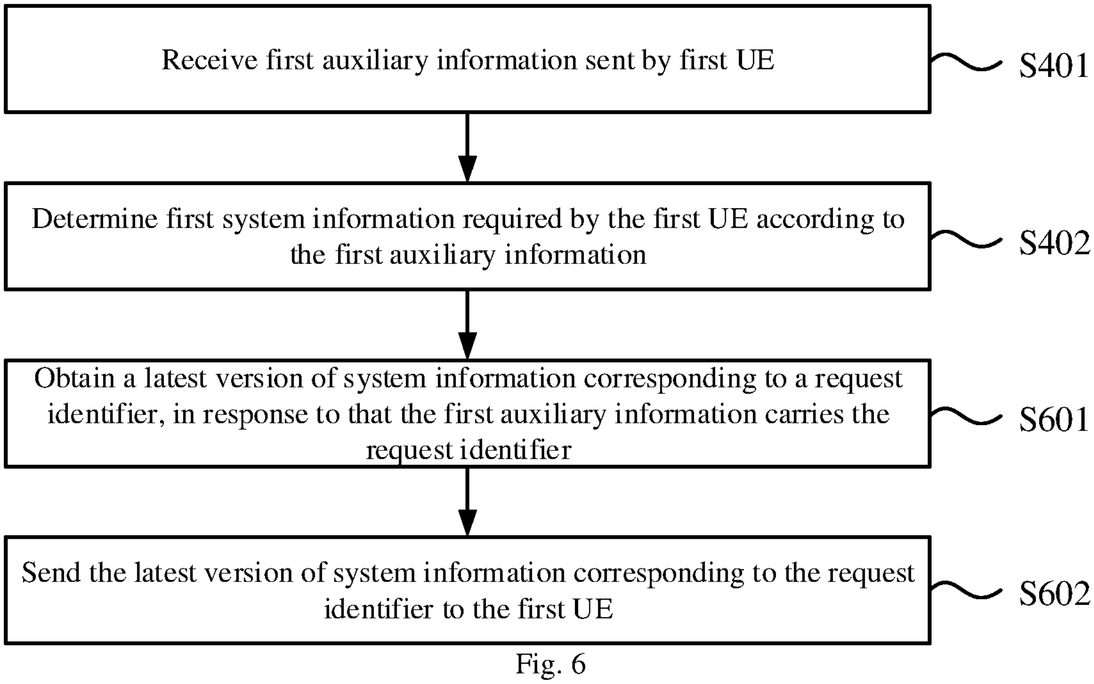
FIG. 6 is a schematic flow chart of yet another auxiliary information receiving method according to an embodiment of the present disclosure.

FIG. 6 is a schematic flow chart of yet another auxiliary information receiving method according to an embodiment of the present disclosure. As shown in FIG. 6, the auxiliary information receiving method further includes: step S601, obtaining a latest version of system information corresponding to a request identifier, in response to that the first auxiliary information carries the request identifier; and step S602, sending the latest version of system information corresponding to the request identifier to the first UE.

The first UE can also determine the system information that needs to be acquired at present. For example, it can be determined that the versions of some currently stored system information are not latest according to the SIB1 broadcast by the second UE, then these versions of system information that are not latest can be used as the system information that needs to be acquired, and then the request identifier can be added to the first auxiliary information and sent to the second UE.

The obtained system information requested by the first UE can be indicated by the request identifier, and the first auxiliary information can carry the request identifier, and the relationship between the request identifier and the system information can be one-to-one, that is, one request identifier bit corresponds to one type of system information, or the relationship between the request identifier and the system information can be one-to-many, that is, one request identifier bit corresponds to many types of system information.

The second UE can send the latest version of system information corresponding to the request identifier to the first UE. For example, if the second UE currently stores the latest version of system information corresponding to the request identifier, it can directly send the stored latest version of system information corresponding to the request identifier to the first UE. For example, if the second UE does not currently store the latest version of system information corresponding to the request identifier, it can obtain the latest version of system information corresponding to the request identifier from the base station and send it to the first UE, and then send the obtained system information to the first UE.

Figure 7:
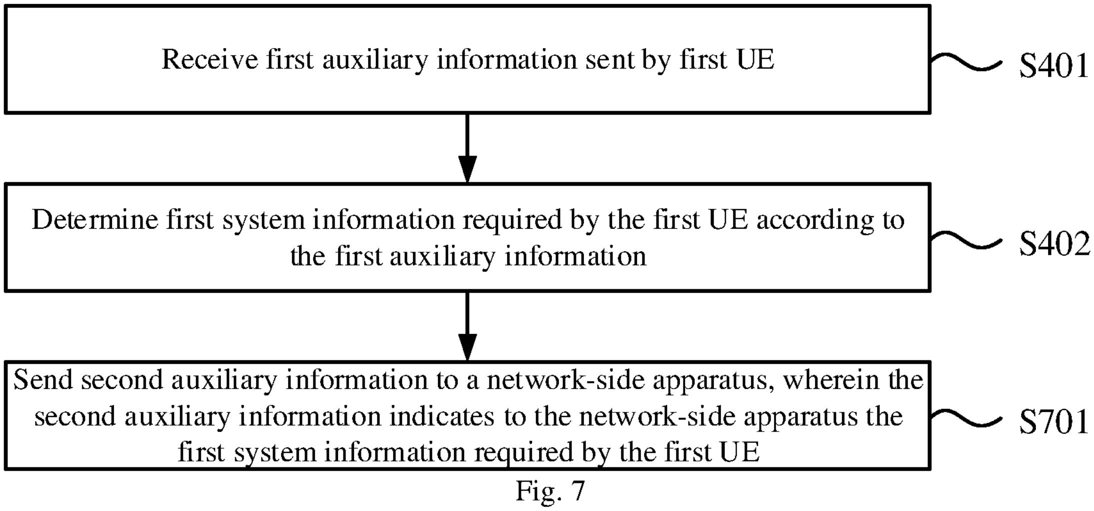
FIG. 7 is a schematic flow chart of yet another auxiliary information receiving method according to an embodiment of the present disclosure.

FIG. 7 is a schematic flow chart of yet another auxiliary information receiving method according to an embodiment of the present disclosure. As shown in FIG. 7, the auxiliary information receiving method further includes: step S701, sending second auxiliary information to a network-side apparatus, in which the second auxiliary information indicates to the network-side apparatus the first system information required by the first UE. The network-side apparatus can be a base station or a core network. The base station as the network-side apparatus will be mainly exemplified below.

In an embodiment, after second UE determines the first system required by the first UE according to the received first auxiliary information, it can send the second auxiliary information to the base station, and inform the base station of the first system information required by the first UE through the second auxiliary information.

In an embodiment, the second auxiliary information is also used to indicate the UE identifier of the first UE. After receiving the second auxiliary information, the base station determines the first system information required by the first UE, and can record what kind of first system information the first UE is interested in for subsequent use; And when the first system information is not broadcast, the latest version of the first system information can be broadcast, so that the second UE can obtain the latest version of the first system information and send it to the first UE.

When the base station determines that the first UE selects or reselects other UEs as relay UEs, it can send the first system information required by the first UE to other UEs, so that other UEs can determine the first system information required by the first UE in time. This action and the above action of sending the first auxiliary information to the selected or reselected UE after the first UE selects or reselects the UE can be performed in an alternative manner or can be both performed, which depends on specific requirements.

Figure 8:
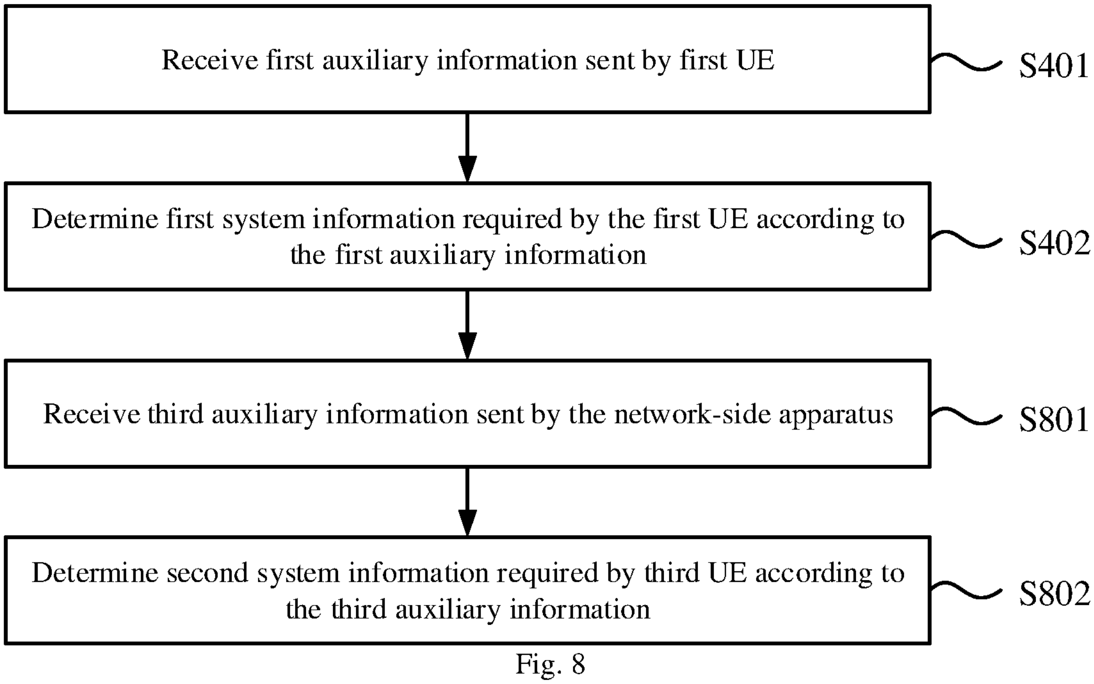
FIG. 8 is a schematic flow chart of yet another auxiliary information receiving method according to an embodiment of the present disclosure.

FIG. 8 is a schematic flow chart of yet another auxiliary information receiving method according to an embodiment of the present disclosure. As shown in FIG. 8, the auxiliary information receiving method further includes: step S801, receiving third auxiliary information sent by the network-side apparatus; and step S802, determining second system information required by third UE according to the third auxiliary information.

In an embodiment, the base station can determine the second system information required by the third UE, and then inform the second UE of the second system information required by the third UE through the third auxiliary information, so that the second UE can determine the second system information required by the third UE as soon as possible when the third UE selects or re-selects the second UE as the relay UE.

Figure 9:
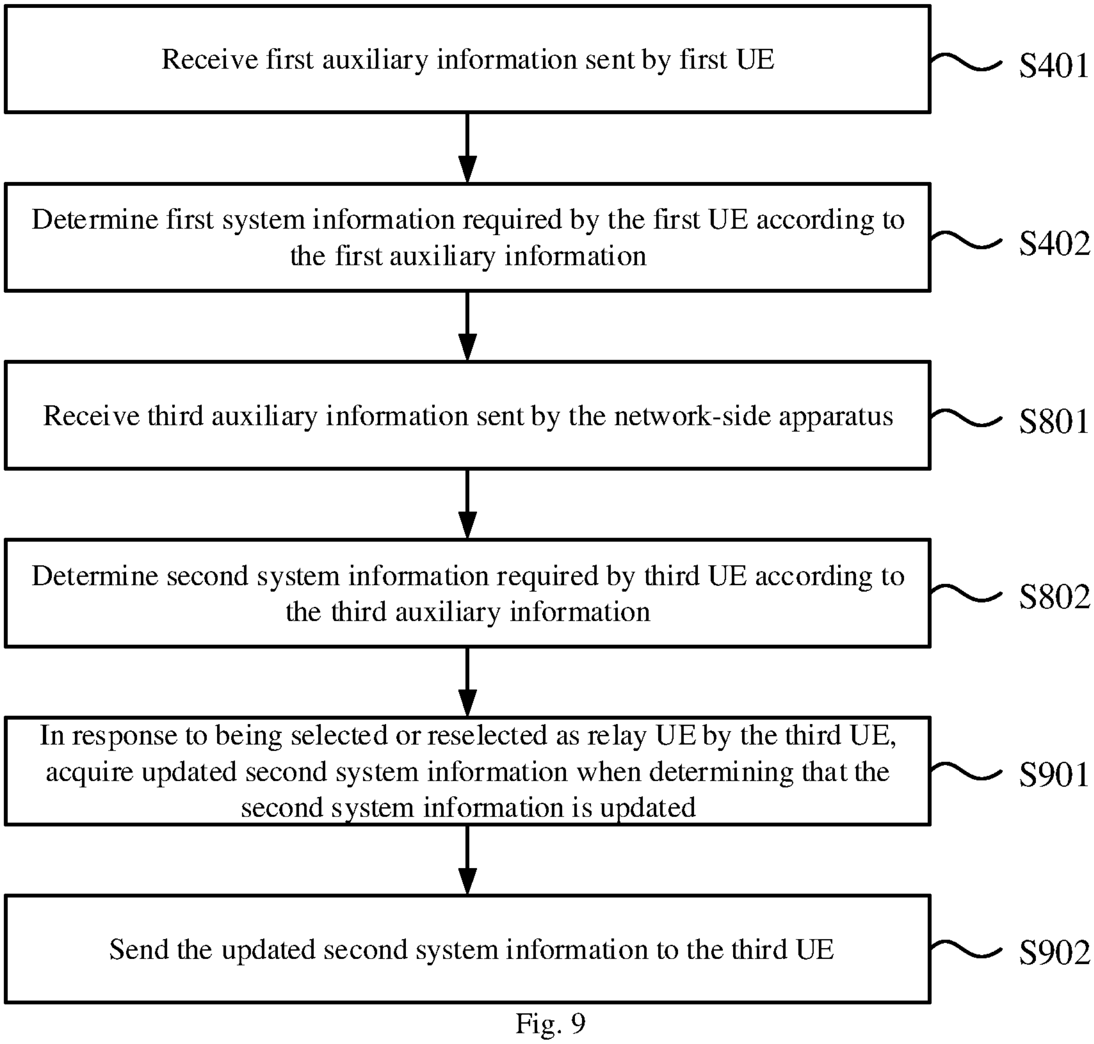
FIG. 9 is a schematic flow chart of yet another auxiliary information receiving method according to an embodiment of the present disclosure.

FIG. 9 is a schematic flow chart of yet another auxiliary information receiving method according to an embodiment of the present disclosure. As shown in FIG. 9, the auxiliary information receiving method further includes: step S901, in response to being selected or reselected as relay UE by the third UE, acquiring updated second system information when determining that the second system information is updated; and step S902, sending the updated second system information to the third UE.

In an embodiment, when the second UE is subsequently selected or re-selected as relay UE by the third UE, since the second system information required by the third UE has been determined in advance according to the auxiliary information sent by the base station, when the second system information is determined to be updated, the updated second system information can be obtained and sent to the third UE, so that the third UE can obtain the updated second system information in time.

Figure 10:
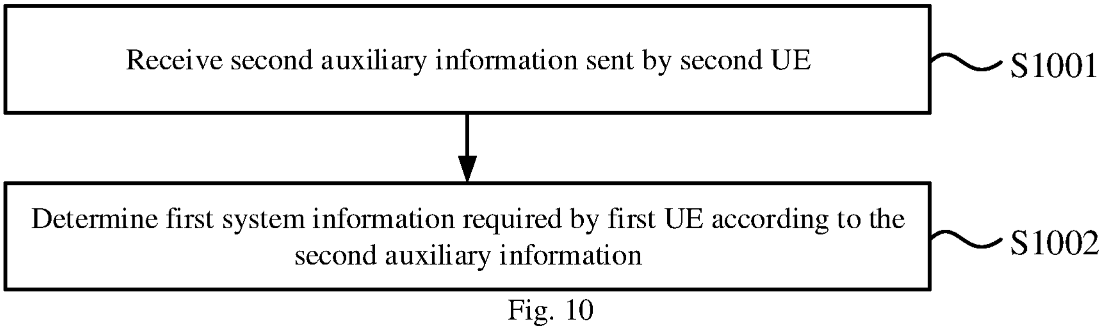
FIG. 10 is a schematic flow chart of an auxiliary information receiving method according to an embodiment of the present disclosure.

FIG. 10 is a schematic flow chart of an auxiliary information receiving method according to an embodiment of the present disclosure. The auxiliary information receiving method shown in this embodiment is applicable to a network-side apparatus, such as a base station and a core network. The base station as the network-side apparatus will be mainly exemplified below, and the base station includes but is not limited to a 4G base station, a 5G base station, a 6G base station and a base station in other communication systems.

There may be a communication connection between the base station and the second UE, and there is no communication connection between the base station and the first UE. In this case, the first UE may act as remote UE and the second UE may act as relay UE.

The first UE can communicate with the second UE, for example, through a sidelink, and the interface between the first UE and the second UE is a PC-5 interface. The first UE and the second UE include but are not limited to mobile phones, tablet computers, wearable devices, sensors, IoT (Internet of Things) devices and other communication apparatuses.

It should be noted that the above description does not mean that the first UE is always in the disconnected state and the second UE is always in the connected state. The first UE can communicate with the second UE when the first UE is in the connected state or when the first UE is in the disconnected state. Instead, embodiments of the present disclosure will be exemplified mainly in the case that the first UE acts as the remote UE and the second UE acts as the relay UE.

As shown in FIG. 10, the auxiliary information receiving method includes: step S1001, receiving second auxiliary information sent by second UE; and step S1002, determining first system information required by first UE according to the second auxiliary information.

In an embodiment, the first UE may determine the system information (SI) required by the first UE, which may include a master information block (MIB) or a system information block (SIB), such as SIB1 or other SIBs.

The system information required by the first UE can be the system information that the first UE needs to use at present (also called the required SI), or the system information that the first UE predicts will be used.

Further, the first UE can send the first auxiliary information to the second UE, and the first system information required by the first UE is indicated to the second UE through the first auxiliary information.

In an embodiment, the first auxiliary information includes an interest identifier corresponding to the first system information. For example, the required system information can be indicated by an interest identifier, and the first auxiliary information can carry the interest identifier corresponding to the first system information. The interest identifier and the system information can have a one-to-one relationship, that is, one interest identifier bit corresponds to one type of system information, or the interest identifier and the system information can have a one-to-many relationship, that is, one interest identifier bit corresponds to many types of system information.

The second UE and the first UE can store the association relationship between the interest identifier and the system information. After receiving the first auxiliary information, the second UE can determine the corresponding system information in the association relationship according to the interest identifier as the first system information required by the first UE, and record and store the type of the first system information required by the first UE. Further, when determining that the first system information is updated, the second UE can acquire the updated first system information and send the updated first system information to the first UE. As a result, even if the first UE does not know that the base station has updated the first system information, the first UE can acquire the updated first system information in time from the second UE.

Further, after determining the first system required by the first UE according to the received first auxiliary information, the second UE can send the second auxiliary information to the base station and inform the base station of the first system information required by the first UE through the second auxiliary information.

In an embodiment, the second auxiliary information is also used to indicate the UE identifier of the first UE. After receiving the second auxiliary information, the base station determines the first system information required by the first UE and records what kind of first system information the first UE is interested in for subsequent use.

When the base station subsequently determines that the first UE selects or reselects other UEs as relay UEs, it can send the first system information required by the first UE to other UEs, so that other UEs can determine the first system information required by the first UE in time.

Figure 11:
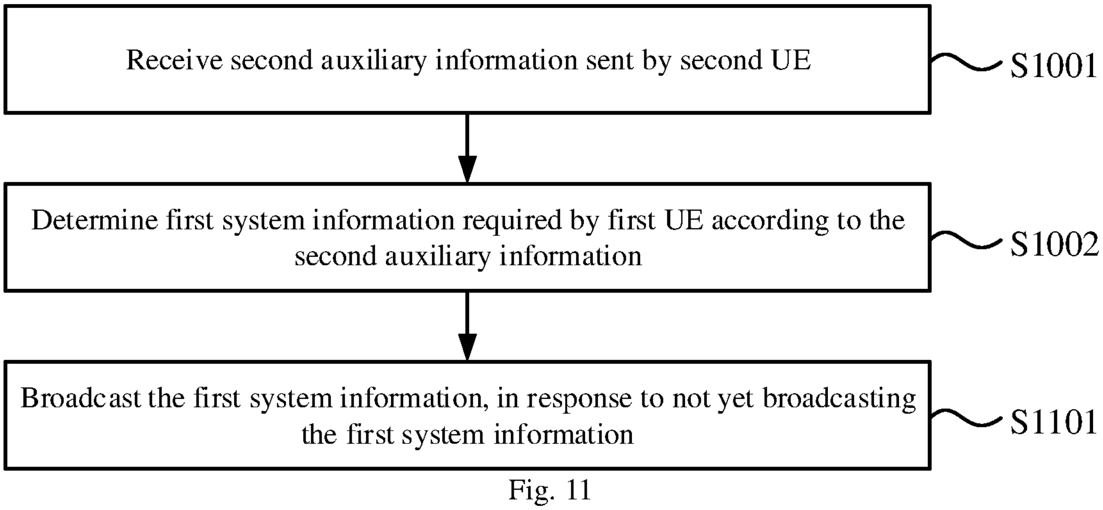
FIG. 11 is a schematic flow chart of another auxiliary information receiving method according to an embodiment of the present disclosure.

FIG. 11 is a schematic flow chart of another auxiliary information receiving method according to an embodiment of the present disclosure. As shown in FIG. 11, the auxiliary information receiving method further includes: step S1101, broadcasting the first system information, in response to not yet broadcasting the first system information.

In an embodiment, after determining the first system information required by the first UE, the base station can further determine whether the first system information is being broadcast. In the case that the first system information is not broadcast, the base station can broadcast the latest version of the first system information so that the second UE can obtain the latest version of the first system information and send it to the first UE.

Figure 12:
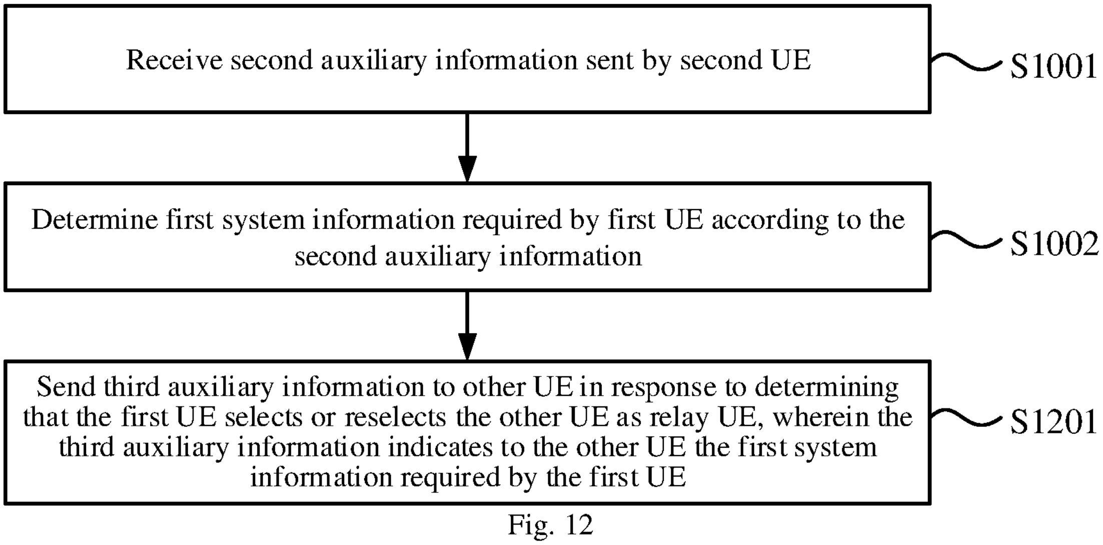
FIG. 12 is a schematic flow chart of yet another auxiliary information receiving method according to an embodiment of the present disclosure.

FIG. 12 is a schematic flow chart of yet another auxiliary information receiving method according to an embodiment of the present disclosure. As shown in FIG. 12, the auxiliary information receiving method further includes: step S1102, sending third auxiliary information to other UE in response to determining that the first UE selects or reselects the other UE as relay UE, in which the third auxiliary information indicates to the other UE the first system information required by the first UE.

In an embodiment, after determining that the first UE selects or reselects other UEs as relay a UE, the base station may send third auxiliary information to other UEs, and indicate the first system information required by the first UE to other UEs through the third auxiliary information. Therefore, after other UEs determine the first system information required by the first UE according to the auxiliary information sent by the base station, other UEs can obtain the updated first system information when determining that the first system information is updated, and send the updated first system information to the third UE, so that the first UE can obtain the updated first system information in time.

Corresponding to the aforementioned embodiments of the auxiliary information sending method and the auxiliary information receiving method, the present disclosure also provides embodiments of the auxiliary information sending device and the auxiliary information receiving device.

Embodiments of the present disclosure propose an auxiliary information sending device, applicable to first UE. The first UE can communicate with second UE, for example, through a sidelink, and an interface between the first UE and the second UE is a PC-5 interface. The first UE and the second UE include but are not limited to mobile phones, tablet computers, wearable devices, sensors, IoT (Internet of Things) devices and other communication apparatuses.

In an embodiment, when executing the steps in the auxiliary information sending method, the first UE can be in a connected state or a disconnected state (such as an idle state and an inactive state), which can be set as required.

In some embodiments of the present disclosure, the first UE may be used as remote UE, and the second UE may be used as relay UE. That is, there may be a communication connection between the second UE and a base station, and there is no communication connection between the first UE and the base station.

It should be noted that the above description does not mean that the first UE is always in the disconnected state and the second UE is always in the connected state. The first UE can communicate with the second UE when the first UE is in the connected state or when the first UE is in the disconnected state. Instead, embodiments of the present disclosure will be exemplified mainly in the case that the first UE acts as the remote UE and the second UE acts as the relay UE.

In an embodiment, the base station includes but is not limited to, a 4G base station, a 5G base station, a 6G base station and a base station in other communication systems.

In an embodiment, the auxiliary information sending device includes one or more processors configured to send first auxiliary information to second UE, in which the first auxiliary information indicates to the second UE first system information required by the first UE.

In an embodiment, the processor is configured to, after selecting or reselecting the second UE as relay UE, send the first auxiliary information to the second UE in response to not yet sending the first auxiliary information to the second UE.

In an embodiment, the processor is configured to send the first auxiliary information to the second UE in response to a change in a type of the required first system information.

In an embodiment, the first auxiliary information includes an interest identifier corresponding to the first system information.

In an embodiment, the first auxiliary information also carries a request identifier, configured to instruct the second UE to send a latest version of system information corresponding to the request identifier to the first UE.

Embodiments of the present disclosure also propose an auxiliary information receiving device, applicable to second UE. The second UE can communicate with first UE, for example, through a sidelink, and an interface between the first UE and the second UE is a PC-5 interface. The first UE and the second UE include but are not limited to mobile phones, tablet computers, wearable devices, sensors, IoT (Internet of Things) devices and other communication apparatuses.

In an embodiment, when communicating with the second UE, the first UE can be in a connected state or a disconnected state (such as an idle state and an inactive state), which can be set as required.

In some embodiments of the present disclosure, the first UE may be used as remote UE, and the second UE may be used as relay UE. That is, there may be a communication connection between the second UE and a base station, and there is no communication connection between the first UE and the base station.

It should be noted that the above description does not mean that the first UE is always in the disconnected state and the second UE is always in the connected state. For example, in an embodiment shown in FIG. 4, the first UE can communicate with the second UE when the first UE is in the connected state or when the first UE is in the disconnected state. Instead, embodiments of the present disclosure will be exemplified mainly in the case that the first UE acts as the remote UE and the second UE acts as the relay UE.

In an embodiment, the base station includes, but is not limited to, a 4G base station, a 5G base station, a 6G base station and a base station in other communication systems.

In an embodiment, the auxiliary information receiving device includes one or more processors configured to receive first auxiliary information sent by first UE; and determine first system information required by the first UE according to the first auxiliary information.

In an embodiment, the processor is further configured to acquire updated first system information in response to an update of the first system information; and send the updated first system information to the first UE.

In an embodiment, the processor is further configured to obtain a latest version of system information corresponding to a request identifier, in response to that the first auxiliary information carries the request identifier; and send the latest version of system information corresponding to the request identifier to the first UE.

In an embodiment, the processor is further configured to second auxiliary information to a network-side apparatus, in which the second auxiliary information indicates to the network-side apparatus the first system information required by the first UE.

In an embodiment, the second auxiliary information is also used to indicate a UE identifier of the first UE.

In an embodiment, the processor is further configured to third auxiliary information sent by the network-side apparatus; and determine second system information required by third UE according to the third auxiliary information.

In an embodiment, the processor is further configured to: in response to being selected or reselected as relay UE by the third UE, acquire updated second system information when determining that the second system information is updated; and send the updated second system information to the third UE.

Embodiments of the present disclosure also propose an auxiliary information receiving device, applicable to a network-side apparatus, such as a base station and a core network. The base station as the network-side apparatus will be mainly exemplified below, and the base station includes but is not limited to a 4G base station, a 5G base station, a 6G base station and a base station in other communication systems.

There may be a communication connection between the base station and the second UE, and there is no communication connection between the base station and the first UE. In this case, the first UE may act as remote UE and the second UE may act as relay UE.

The first UE can communicate with the second UE, for example, through a sidelink, and an interface between the first UE and the second UE is a PC-5 interface. The first UE and the second UE include but are not limited to mobile phones, tablet computers, wearable devices, sensors, IoT (Internet of Things) devices and other communication apparatuses.

It should be noted that this does not mean that the first UE is always in a disconnected state and the second UE is always in a connected state. The first UE can communicate with the second UE when it is in a connected state, or can communicate with the second UE when it is in a disconnected state. Instead, the embodiment of the present disclosure will be exemplified mainly in the case that the first UE acts as remote UE and the second UE acts as relay UE.

In an embodiment, the auxiliary information receiving device includes one or more processors configured to receive second auxiliary information sent by second UE; and determine first system information required by first UE according to the second auxiliary information.

In an embodiment, the processor is further configured to broadcast the first system information, in response to not yet broadcasting the first system information.

In an embodiment, the processor is further configured to send third auxiliary information to other UE in response to determining that the first UE selects or reselects the other UE as relay UE, in which the third auxiliary information indicates to the other UE the first system information required by the first UE.

Regarding the devices in the above embodiments, specific ways in which various module perform the operations have been described in detail in the embodiments of the related methods, which will not be described in detail here.

For embodiments of apparatus, since it basically corresponds to embodiments of method, the relevant points can be referred to the partial description of embodiments of the method. Embodiments of apparatus described above is only schematic, in which the modules described as separate components may or may not be physically separated, and the components displayed as modules may or may not be physical modules, that is, they may be located in one place or distributed to multiple network modules. Some or all of the modules can be selected according to actual needs to achieve the purpose of the technical solutions of embodiments, which can be understood and implemented by those skilled in the art in the field without creative effort.

Embodiments of the present disclosure also provide a communication apparatus, including a processor; and a memory configured to store a computer program that, when executed by the processor, implements the auxiliary information sending method applicable to the first UE described in any of the above embodiments and/or the auxiliary information receiving method applicable to the second UE described in any of the above embodiments.

Embodiments of the present disclosure also provide a communication apparatus, including a processor; and a memory configured to store a computer program that, when executed by the processor, implements the auxiliary information receiving method applicable to the network-side apparatus described in any of the above embodiments.

Embodiments of the present disclosure also provide a computer-readable storage medium having stored therein a computer program that, when executed by a processor, implements steps of the auxiliary information sending method applicable to the first UE described in any of the above embodiments and/or the auxiliary information receiving method applicable to the second UE described in any of the above embodiments.

Embodiments of the present disclosure also provide a computer-readable storage medium having stored therein a computer program that, when executed by a processor, implements steps of the auxiliary information receiving method applicable to the network-side apparatus described in any of the above embodiments.

Figure 13:
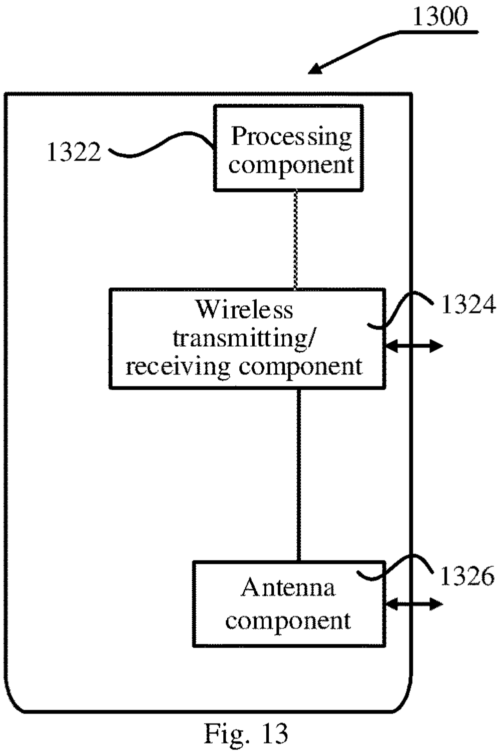
FIG. 13 is a schematic block diagram of an auxiliary information receiving device according to an embodiment of the present disclosure.

As shown in FIG. 13, FIG. 13 is a schematic block diagram of an apparatus 1300 for receiving auxiliary information according to an embodiment of the present disclosure. The apparatus 1300 can be provided as a base station. Referring to FIG. 13, the apparatus 1300 includes a processing component 1322, a wireless sending/receiving component 1324, an antenna component 1326, and a signal processing part unique to a wireless interface. The processing component 1322 further includes one or more processors. One of the processors in the processing component 1322 is configured to implement the auxiliary information receiving method applicable to the network-side apparatus described in any of the above embodiments.

Figure 14:
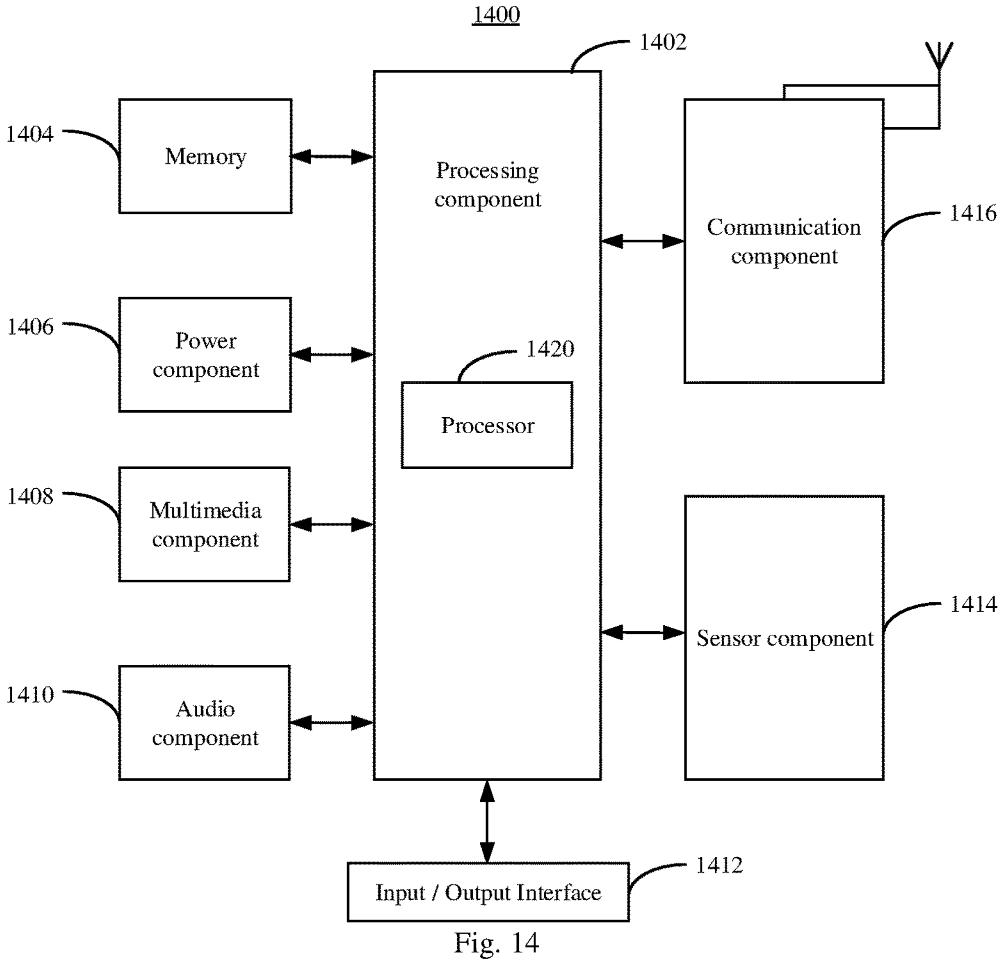
FIG. 14 is a schematic block diagram of an apparatus for sending and receiving auxiliary information according to an embodiment of the present disclosure.

FIG. 14 is a schematic block diagram of an apparatus 1400 for sending and receiving auxiliary information according to an embodiment of the present disclosure. For example, the apparatus 1400 can be a mobile phone, a computer, a digital broadcasting terminal, a messaging device, a game console, a tablet device, a medical device, a fitness device, a personal digital assistant and so on.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 generally controls the overall operation of the apparatus 1400, such as operations associated with display, telephone call, data communication, camera operation and recording operation. The processing component 1402 may include one or more processors 1420 to execute instructions to complete all or part of the steps of the above auxiliary information sending method and auxiliary information receiving method applicable to UE. In addition, the processing component 1402 can include one or more modules to facilitate interaction between the processing component 1402 and other components. For example, the processing component 1402 can include a multimedia module to facilitate interaction between the multimedia component 1408 and the processing component 1402.

The memory 1404 is configured to store various types of data to support operations at the apparatus 1400. Examples of these data include instructions for any application or method operating on the apparatus 1400, contact data, phone book data, messages, pictures, videos, etc. The memory 1404 can be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 1406 provides power to various components of the apparatus 1400. The power component 1406 may include a power management system, one or more power supplies, and other components associated with generating, managing and distributing power for the apparatus 1400.

The multimedia component 1408 includes a screen that provides an output interface between the apparatus 1400 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, sliding and gestures on the touch panel. The touch sensor may not only sense the boundary of a touch or sliding action, but also detect the duration and pressure related to the touch or sliding operation. In some embodiments, the multimedia component 1408 includes a front camera and/or a rear camera. When the apparatus 1400 is in an operation mode, such as a shooting mode or a video mode, the front camera and/or the rear camera can receive external multimedia data. Each front camera and rear camera can be a fixed optical lens system or have focal length and optical zoom capability.

The audio component 1410 is configured to output and/or input audio signals. For example, the audio component 1410 includes a microphone (MIC) configured to receive external audio signals when the apparatus 1400 is in operation modes, such as a call mode, a recording mode and a voice recognition mode. The received audio signal may be further stored in the memory 1404 or sent via the communication component 1416. In some embodiments, the audio component 1410 further includes a speaker for outputting audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors for providing various aspects of status assessment for the apparatus 1400. For example, the sensor component 1414 can detect the open/closed state of the apparatus 1400, the relative positioning of components, such as the display and keypad of the apparatus 1400, the position change of the apparatus 1400 or a component of the apparatus 1400, the presence or absence of contact of user with the apparatus 1400, the orientation or acceleration/deceleration of the apparatus 1400 and the temperature change of the apparatus 1400. The sensor component 1414 may include a proximity sensor configured to detect the presence of a nearby object without any physical contact. The sensor component 1414 may also include an optical sensor, such as a CMOS or CCD image sensor, for use in imaging applications. In some embodiments, the sensor component 1414 may further include an acceleration sensor, a gyro sensor, a magnetic sensor, a pressure sensor or a temperature sensor.

The communication component 1416 is configured to facilitate wired or wireless communication between the apparatus 1400 and other devices. The apparatus 1400 can access wireless networks based on communication standards, such as Wi-Fi, 2G or 3G, 4G LTE, 5G NR or their combination. In an embodiment, the communication component 1416 receives a broadcast signal or broadcast related information from an external broadcast management system via a broadcast channel. In an embodiment, the communication component 1416 further includes a near field communication (NFC) module to facilitate the short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the apparatus 1400 can be implemented by one or more application-specific integrated circuits (ASIC), digital signal processors (DSP), digital signal processing device (DSPD), programmable logic devices (PLD), field programmable gate arrays (FPGA), controllers, microcontrollers, microprocessors or other electronic components, and is used for executing the above auxiliary information sending methods and auxiliary information receiving methods applicable to UE.

In an embodiment, there is also provided a non-transitory computer-readable storage medium including instructions, such as included in the memory 1404, executable by the processor 1420 in the apparatus 1400, for performing the auxiliary information sending method and the auxiliary information receiving method applicable to the UE. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with the true scope of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

It should be noted that in the present disclosure, relational terms such as "first" and "second" are only used to distinguish one entity or operation from another entity or operation, without necessarily requiring or implying any such actual relationship or sequence between these entities or operations. Moreover, the term "including", "including" or any other variation thereof is intended to cover non-exclusive inclusion, so that a process, method, article or equipment that includes a series of elements not only includes those elements, but also includes other elements not explicitly listed, or also includes elements inherent to such process, method, article or equipment. Without further restrictions, the elements defined by the statement "including a . . . " does not exclude the existence of another identical element in the process, method, article or equipment that includes the elements.

The methods and devices according to the embodiments of the present disclosure are described in detail above, and the principles and implementations of the present disclosure are elaborated with specific examples herein. The description of the above embodiments is only used to help understand the methods of the present disclosure. Meanwhile, for those skilled in the art, there may be changes in specific implementations and application scopes based on the present disclosure. To sum up, the contents of the specification should not be understood as limitations on the present disclosure.

What is claimed is:

1. An assistant information sending method, applicable to first user equipment (UE), and comprising:

sending first assistant information to second UE, wherein the first assistant information indicates to the second UE first system information required by the first UE, wherein sending the first assistant information to the second UE comprises:

after selecting or reselecting the second UE as a relay UE, sending the first assistant information to the second UE in response to not yet sending the first assistant information to the second UE.

2. The assistant information sending method according to claim 1, wherein sending the first assistant information to the second UE comprises:

sending the first assistant information to the second UE in response to a change in a type of the required first system information.

3. The assistant information sending method according to claim 1, wherein the first assistant information carries a request identifier, configured to instruct the second UE to send a latest version of system information corresponding to the request identifier to the first UE.

4. A communication apparatus, comprising:

a processor; and a memory configured to store a computer program executable by the processor, wherein the processor is configured to perform the assistant information sending method according to claim 1.

5. A non-transitory computer-readable storage medium, having stored therein a computer program that, when executed by a processor, causes the processor to perform the assistant information sending method according to claim 1.

6. An assistant information receiving method, applicable to second UE, and comprising:

receiving first assistant information sent by first UE; and determining first system information required by the first UE according to the first assistant information, wherein after the second UE is selected or reselected as a relay UE, the first assistant information is sent to the second UE in response to the first assistant information being not yet sent to the second UE.

7. The assistant information receiving method according to claim 6, further comprising:

acquiring updated first system information in response to an update of the first system information; and sending the updated first system information to the first UE.

8. The assistant information receiving method according to claim 6, further comprising:

obtaining a latest version of system information corresponding to a request identifier, in response to that the first assistant information carries the request identifier; and sending the latest version of system information corresponding to the request identifier to the first UE.

9. The assistant information receiving method according to claim 6, further comprising:

sending second assistant information to a network-side apparatus, wherein the second assistant information indicates to the network-side apparatus the first system information required by the first UE.

10. The assistant information receiving method according to claim 9, wherein the second assistant information further indicates a UE identifier of the first UE.

11. The assistant information receiving method according to claim 6, further comprising:

receiving third assistant information sent by a network-side apparatus; and determining second system information required by third UE according to the third assistant information.

12. The assistant information receiving method according to claim 11, further comprising:

in response to being selected or reselected as a relay UE by the third UE, acquiring updated second system information when determining that the second system information is updated; and sending the updated second system information to the third UE.

13. A communication apparatus, comprising:

a processor; and a memory configured to store a computer program executable by the processor, wherein the processor is configured to perform the assistant information receiving method according to claim 6.

14. A non-transitory computer-readable storage medium, having stored therein a computer program that, when executed by a processor, causes the processor to perform the assistant information receiving method according to claim 6.

15. An assistant information receiving method, applicable to a network-side apparatus, and comprising:

receiving second assistant information sent by second UE; and determining first system information required by first UE according to the second assistant information, wherein the first system information is indicated to the second UE by first assistant information, and after the second UE is selected or reselected as a relay UE, the first assistant information is sent to the second UE in response to the first assistant information being not yet sent to the second UE.

16. The assistant information receiving method according to claim 15, further comprising:

broadcasting the first system information, in response to not yet broadcasting the first system information.

17. The assistant information receiving method according to claim 15, further comprising:

sending third assistant information to other UE in response to determining that the first UE selects or reselects the other UE as a relay UE, wherein the third assistant information indicates to the other UE the first system information required by the first UE.

18. A communication apparatus, comprising:

a processor; and a memory configured to store a computer program executable by the processor, wherein the processor is configured to perform the assistant information receiving method according to claim 15.

19. A non-transitory computer-readable storage medium, having stored therein a computer program that, when executed by a processor, causes the processor to perform the assistant information receiving method according to claim 15.

* * * * *